United States Patent
Hino et al.

(10) Patent No.: US 7,462,262 B2
(45) Date of Patent: Dec. 9, 2008

(54) VERTICAL MULTITUBULAR HEAT EXCHANGER AND DISTILLATION COLUMN SYSTEM INCLUDING THE SAME

(75) Inventors: Tomomichi Hino, Otake (JP); Akira Ogawa, Otake (JP); Shigetoshi Shimauchi, Otake (JP); Toshihiro Sato, Otake (JP); Yasuhiro Kabu, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 400 days.

(21) Appl. No.: 10/919,293

(22) Filed: Aug. 17, 2004

(65) Prior Publication Data
US 2005/0040023 A1    Feb. 24, 2005

Related U.S. Application Data

(63) Continuation of application No. PCT/JP03/01654, filed on Feb. 17, 2003.

(30) Foreign Application Priority Data
Feb. 18, 2002    (JP) ............................. 2002-039603

(51) Int. Cl.
*B01D 3/04* (2006.01)
*F28F 9/02* (2006.01)
*F28D 7/16* (2006.01)

(52) U.S. Cl. ............... 202/237; 159/27.1; 165/147; 165/158; 165/160; 165/170; 165/183; 202/262

(58) Field of Classification Search ............ 159/27.1; 165/146–147, 158, 160, 168–178, 183; 202/237, 202/262; 203/8, DIG. 21; 562/600
See application file for complete search history.

(56) References Cited

U.S. PATENT DOCUMENTS 946,238 A * 1/1910 Loomis .................. 165/114
1,466,357 A * 8/1923 Engel, Sr. ................ 159/27.1
3,227,630 A * 1/1966 Beckman .................. 202/205

(Continued)

FOREIGN PATENT DOCUMENTS

CN    1273356 A    11/2000

(Continued)

*Primary Examiner*—Virginia Manoharan
(74) *Attorney, Agent, or Firm*—Oblon, Spivak, McClelland, Maier & Neustadt, P.C.

(57) ABSTRACT

A vertical multitubular heat exchanger that can prevent clogging of a polymerized material and is continuously operable for an extended period of time is provided. The vertical multitubular heat exchanger (1) of the present invention introduces a process fluid containing an easily-polymerizable substance into heat exchanger tubes (28) to perform heat exchange. The vertical multitubular heat exchanger (1) includes a shell (2) extending in a vertical direction, an upper tube sheet (8) and a lower tube sheet (10) respectively disposed at the upper portion (4) and the lower portion (6) of the shell (2), and a plurality of heat exchanger tubes (28) whose outer circumferences (26) of both ends are respectively fixed to the upper tube sheet (8) and the lower tube sheet (10). An upper surface (34) of the upper tube sheet (8) is formed to be sloped and at least one of the heat exchanger tubes (28) is disposed in the vicinity of the lowest position of the upper surface (34) of the upper tube sheet (8).

8 Claims, 8 Drawing Sheets

U.S. PATENT DOCUMENTS 3,554,800 A * 1/1971 Javet et al. .................. 127/16
6,620,969 B1   9/2003 Nishimura et al.

FOREIGN PATENT DOCUMENTS

| EP | 1 034 824 A2 | 9/2000 |
|----|--------------|--------|
| JP | 56-141827    | 11/1981 |
| JP | 59-183297    | 10/1984 |
| JP | 63-32297     | 2/1988 |

* cited by examiner

VERTICAL MULTITUBULAR HEAT EXCHANGER AND DISTILLATION COLUMN SYSTEM INCLUDING THE SAME

CROSS REFERENCE TO RELATED APPLICATION

This is a Continuation Application of PCT Application No. PCT/JP03/01654, filed on Feb. 17, 2003, which was not published under PCT Article 21(2) in English. This application is based upon and claims the benefit of priority from the prior Japanese Patent Application No. 2002-39603, filed Feb. 18, 2002, the entire contents of which are incorporated herein by reference.

TECHNICAL FIELD

The present invention relates to a vertical multitubular heat exchanger and a distillation column system, and more particularly to a vertical multitubular heat exchanger for performing heat exchange by introducing a process fluid containing easily-polymerizable substance into heat exchanger tubes and a distillation column system using the vertical multitubular heat exchanger.

BACKGROUND ART

A multitubular heat exchanger for exchanging heat between a hot fluid and a cold fluid is a device widely used in a chemical industry. Compared with other types of heat exchangers, the multitubular heat exchanger is characterized by its high reliability since it can be used under severe conditions and operated continuously for an extended period of time. One example of a multitubular heat exchanger will be explained with reference to FIG. 10, which is a cross-sectional view of a conventional vertical multitubular heat exchanger.

As shown in FIG. 10, a vertical multitubular heat exchanger 120 comprises a tubular shell 122 extending in the vertical direction, flat upper and lower tube sheets 128 and 130 disposed at the upper and lower parts 124 and 126 respectively of the tubular shell 122, and a plurality of heat exchanger tubes 134. An outer circumferences 132 of both ends of each heat exchanger tube 134 are respectively fixed to the upper and lower tube sheets 128 and 130, and a process fluid is introduced into the heat exchanger tubes 134. A fluid for performing heat exchange with the process fluid introduced into the heat exchanger tubes 134 is supplied around the heat exchanger tubes 134.

As one example of an application of the vertical multitubular heat exchanger 120 explained above, a case where the vertical multitubular heat exchanger 120 is used as a condenser for a distillation column system (not shown) will be explained. When the process fluid to be distilled is vaporized and a resulting process gas thus obtained is then introduced into the heat exchanger tubes 134 at the upper tube sheet 128 side thereof, the process gas is cooled and condensed by the fluid supplied around the heat exchanger tubes 134. Then, the process fluid comes out as a liquid from the lower tube sheet 130 side of the heat exchanger tubes 134.

However, in the above-mentioned vertical multitubular heat exchanger 120, the continuous operation thereof for an extended period of time is sometimes prevented by adhesion of foreign materials such as a polymerized material to an upper surface 136 of the upper tube sheet 128 and to inner surfaces 138 of the heat exchanger tubes 134 near the upper openings thereof. This will be explained herein below.

If the process fluid is a methacrolein-containing liquid, for example, that is, if the process fluid contains in its components an easily-polymerizable substance which is significantly polymerizable, then there is a tendency for the polymerized material of the easily-polymerizable substance to adhere to the upper surface 136 of the upper 128 and to the inner surfaces 138 of the heat exchanger tubes 134 near the upper openings thereof. In addition, the polymerized material that has adhered to the upper surface 136 of the upper tube sheet 128 and to the inner surfaces 138 of the heat exchanger tubes 134 near the upper openings thereof grows as an operation time passes. Here, the term "grow" refers to the increase in size of the adhered polymerized material due to additional polymerization occurring on the surface of the adhered polymerized material. Such adherence and growth of the polymerized material decreases heat transfer efficiency of the vertical multitubular heat exchanger 120, resulting in the decrease of heat exchanger effectiveness and separation efficiency of the vertical multitubular heat exchanger 120. Since the polymerized material adheres throughout the upper surface 136 of the upper tube sheet 128, the heat transfer efficiency is remarkably reduced.

If the operation is continued further, then the growth of the polymerized material progresses until it clogs the heat exchanger tubes 134. This makes it necessary for the clogged polymerized material to be removed from the heat exchanger tubes 134 and also makes impossible for the vertical multitubular heat exchanger 120 to be operated. As a result, the continuous long term operation of the vertical multitubular heat exchanger 120 will be prevented. Furthermore, the continuous long term operation of the distillation column system (not shown) comprising such a vertical multitubular heat exchanger 120 will also be prevented.

DISCLSOURE OF INVENTION

It is therefore an object of the present invention to provide a vertical multitubular heat exchanger that can prevent the clogging by the polymerized material and is continuously operable for an extended period of time.

It is also an object of the present invention to provide a distillation column system that is continuously operable for an extended period of time.

The above-mentioned object is achieved according to the present invention by providing a vertical multitubular heat exchanger for performing heat exchange by introducing into heat exchanger tubes a process fluid containing an easily-polymerizable substance, comprising a shell extending in a vertical direction, an upper tube sheet and a lower tube sheet respectively disposed at the upper portion and the lower portion of the shell, and a plurality of heat exchanger tubes whose outer circumferences of both ends are respectively fixed to the upper tube sheet and the lower tube sheet, wherein an upper surface of the upper tube sheet is formed to be sloped and at least one of the heat exchanger tubes is disposed in the vicinity of the lowest position of the upper surface of this upper tube sheet.

According to the vertical multitubular heat exchanger of the present invention, in the case of cooling a hot process fluid, for example, if the process fluid is introduced into the heat exchanger tubes at the upper tube sheet side thereof, then it comes out of the heat exchanger tubes at the lower tube sheet side thereof after having exchanged the heat with a lower temperature fluid around the heat exchanger tubes. In the case of the process fluid containing the easily-polymerizable substance, if the process fluid is retained at the upper surface of the upper tube sheet and the upper ends of the heat exchanger tubes etc. for a long time, then the easily-polymerizable substance tends to be polymerized and the polymeric matter tends to adhere to the upper tube sheet and the like. However, according to the present invention, since the upper surface of the upper tube sheet is formed to be sloped, a retention of the process fluid, which normally occurs at a flat upper surface of the upper tube sheet of a conventional vertical multitubular heat exchanger, can be substantially eliminated. In addition, since at least one heat exchanger tube is disposed in the vicinity of the lowest position of the upper surface of the upper tube sheet, the retention of the process fluid flowing downward can be prevented more reliably. With such retention-preventing effects, the easily-polymerizable substance becomes difficult to polymerize thereby preventing adhesion of the polymerized material to the upper tube sheet or the heat exchanger tubes. Furthermore, even if the operation of the vertical multitubular heat exchanger is continued, the growth of the polymerized material is prevented by the above-mentioned retention-preventing effects, and therefore no clogging by the polymerized material occurs in the heat exchanger tubes. Accordingly, the operation for removing the polymerized material that has to be frequently conducted for the conventional vertical multitubular heat exchangers becomes unnecessary, which allows for the continuous long term operation of the vertical multitubular heat exchanger.

In the vertical multitubular heat exchanger of the present invention, the upper surface of the upper tube sheet is preferably formed to be sloped downward from the outer portion toward the central portion thereof, and more preferably the upper surface of the upper tube sheet is sloped downward by 0.005 to 0.1 radian relative to the plane containing the upper outer edge of the upper tube sheet. The upper tube sheet of the vertical multitubular heat exchanger can be easily manufactured. Further, although as great a slope angle as possible for the upper surface of the upper tube sheet may be desired in view of preventing the polymerized material adhesion, it is preferable that it be less than 0.1 radian in view of the processing easiness and the processing cost. Also, an experiment conducted by the inventors of the present inventions has demonstrated that a slope angle greater than or equal to 0.005 radian can better prevent the adhesion of the process fluid polymerized material at the upper surface of the upper tube sheet.

According to the invention, preferably, the upper end of the heat exchanger tube disposed in the vicinity of the lowest position of the upper tube sheet is provided so as to not protrude from the upper surface of the upper tube sheet. In the vertical multitubular heat exchanger, the process fluid on the upper surface of the upper tube sheet flows toward the lowest position of the upper tube sheet, and most of the process fluid flows into the heat exchanger tube that is disposed in the vicinity of that lowest position, thereby preventing adhesion of the polymerized across the entire surface of the upper tube sheet. Further, in the present invention, more preferably, the upper ends of all the plurality of heat exchanger tubes are provided so as to not protrude from the upper surface of the upper tube sheet. The vertical multitubular heat exchanger of the present invention can facilitate the prevention of the retention of the process fluid on the upper surface of the upper tube sheet.

Alternatively, in the present invention, the upper ends of all the plurality of heat exchanger tubes except for the one disposed in the vicinity of the lowest position of the upper tube sheet may be provided so as to protrude above the upper tube sheet. According to the present invention, the connecting strength between the upper tube sheet and the heat exchanger tubes can be increased. Owing to this coupling strength, even if the heat exchanger tubes are constantly subjected to the vibrations caused by the flowing in and out of both the process fluid and the fluid flowing outside the tubes, the vibrations caused by the pump or the compressor, and a pulsating flow directly from rotary pump machinery or the like, the sealing performance of the connections between the heat exchanger tubes and the upper tube sheet and those between the heat exchanger tubes and the lower tube sheet is prevented from being lowered, and therefore leaks of the process fluid from the connections therebetween can be prevented. Further, by increasing heat transfer efficiency by decreasing the diameter of the heat exchanger tubes and also increasing the number of the tubes to broaden the heat-exchanging surface between the process fluid and the fluid flowing outside of the tubes, the connecting strength between multiple thinner heat exchanger tubes and the upper and lower tube sheets can be increased.

According to the present invention, the lower surface of the lower tube sheet is preferably formed to be sloped. The vertical multitubular heat exchanger can also prevent the retention of the easily-polymerizable substance on the lower tube sheet.

In addition, the lower surface of the lower tube sheet is preferably sloped downward from the outer portion toward the central portion thereof by 0.005 to 0.1 radian relative to the plane containing the lower outer edge of the lower tube sheet. This is due to the same reason as that explained above regarding the upper surface of the upper tube sheet.

According to the present invention, preferably, the easily-polymerizable substance is acrolein, methacrolein, acrylic acid, methacrylic acid or ester thereof. Also, the process fluid preferably contains a polymerization inhibitor.

Further, the above-mentioned object is achieved according to the present invention by providing a distillation column system that comprises a distillation column for distilling a fluid containing easily-polymerizable substance and a condenser connected to a column top of the distillation column, the condenser being the above-mentioned vertical multitubular heat exchanger.

According to the distillation column system of the present invention, since it employs the above-mentioned vertical multitubular heat exchanger as the condenser, a long-term continuous operation of the distillation column system can be achieved.

Also, the above-mentioned object is achieved according to the present invention by providing a distillation column system that comprises a distillation column for distilling a fluid containing easily-polymerizable substance and a reboiler connected to a column bottom of the distillation column, the reboiler being the above-mentioned vertical multitubular heat exchanger.

According to the distillation column system of the present invention, since it employs the above-mentioned vertical multitubular heat exchanger as the reboiler, a long-term continuous operation of the distillation column system can be achieved Further, the above-mentioned object is achieved according to the present invention by providing a distillation column system that comprises a distillation column for distilling a fluid containing easily-polymerizable substance, a condenser connected to the column top of the distillation column, and a reboiler connected to the column bottom of the distillation column, the condenser and the reboiler being the above-mentioned vertical multitubular heat exchangers. According to the distillation column system of the present invention, since it employs the above-mentioned vertical multitubular heat exchangers as the condenser and the reboiler, a long-term continuous operation of the distillation column system can be achieved.

DESCRIPTION OF PREFERRED EMBODIMENTS

Figure 1:
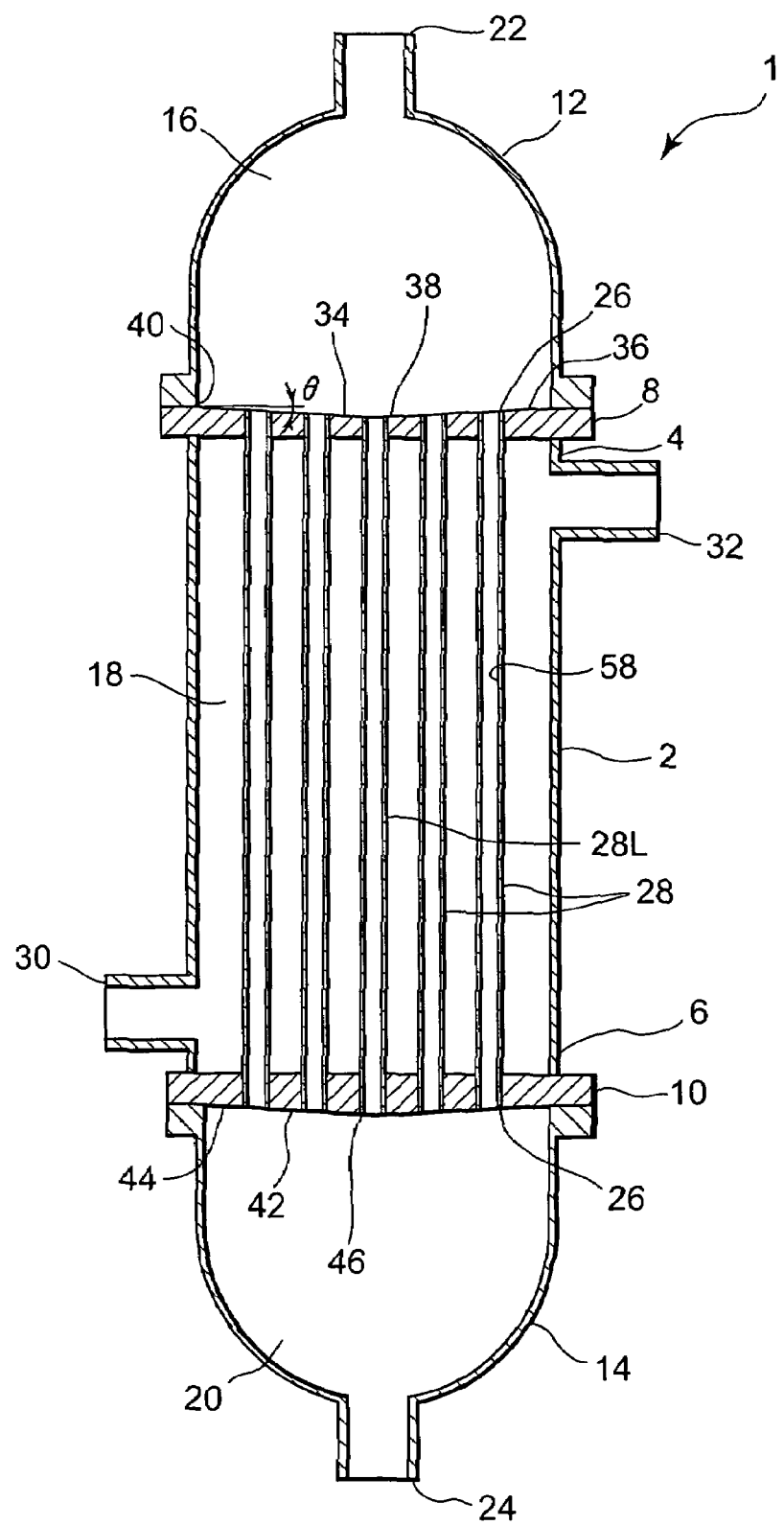
FIG. 1 is a longitudinal sectional view of a vertical multitubular heat exchanger according to a first embodiment of the present invention.
Figure 2:
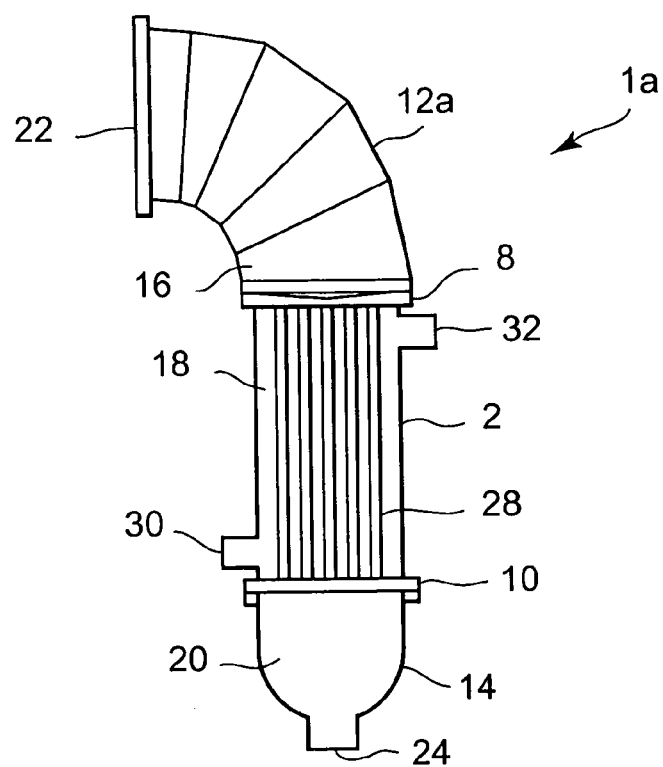
FIG. 2 shows a variation of a top cover for the vertical multitubular heat exchanger of FIG. 1.
Figure 3:
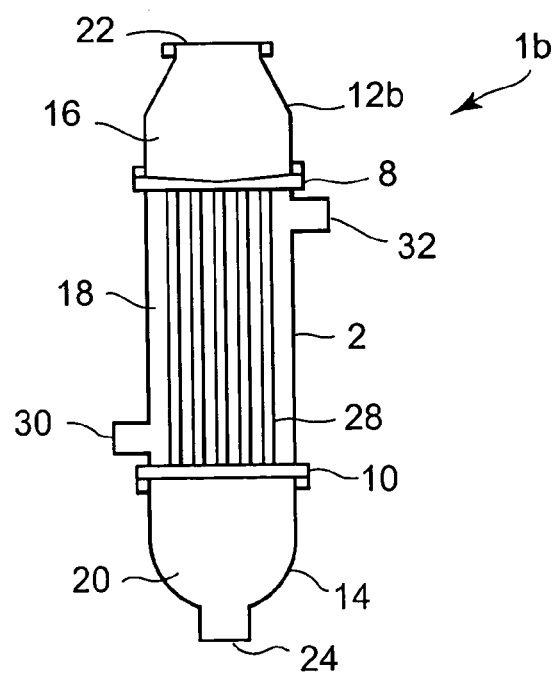
FIG. 3 shows another variation of the top cover for the vertical multitubular heat exchanger of FIG. 1.
Figure 4:
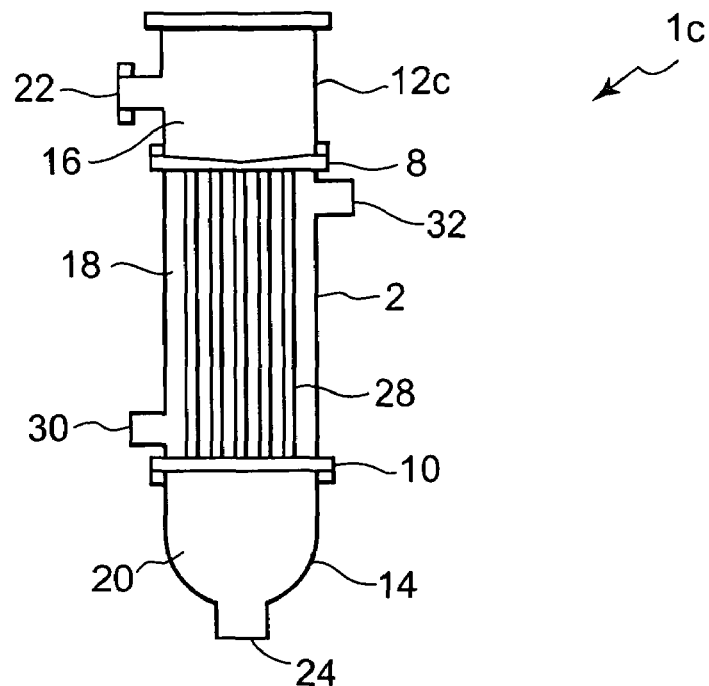
FIG. 4 shows yet another variation of the top cover for the vertical multitubular heat exchanger of FIG. 1.
Figure 5:
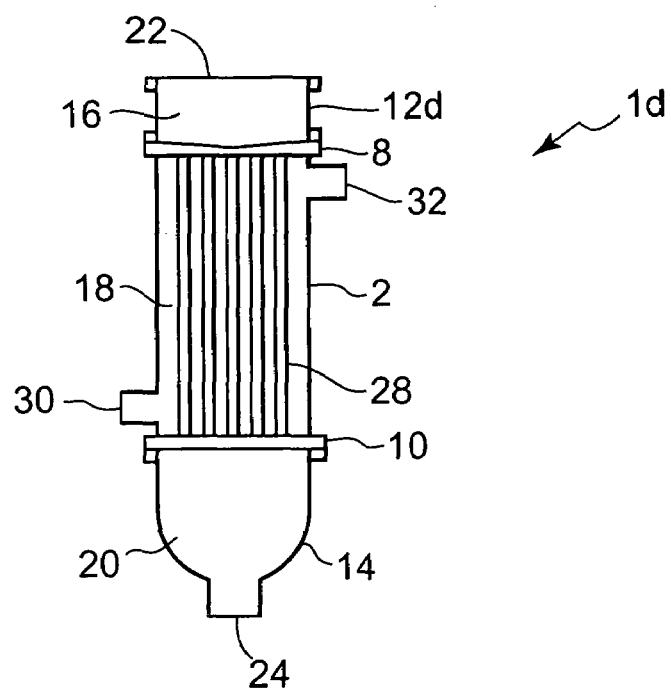
FIG. 5 shows still another variation of the top cover for the vertical multitubular heat exchanger of FIG. 1.

Embodiments of a vertical multitubular heat exchanger according to the present invention will be explained with reference to drawings. FIG. 1 is a longitudinal sectional view of a vertical multitubular heat exchanger according to the first embodiment of the present invention.

As shown in FIG. 1, the vertical multitubular heat exchanger 1 has a tubular shell 2 extending in a vertical direction. The tubular shell 2 has preferably a circular cross section, but it may have a cross section of any other shape. The vertical multitubular heat exchanger 1 also has an upper tube sheet 8 and a lower tube sheet 10 respectively disposed at an upper portion 4 and a lower portion 6 of the tubular shell 2, a top cover 12 disposed over the upper tube sheet 8, and a bottom cover 14 disposed beneath the lower tube sheet 10. The top cover 12 may have a shape as shown in FIG. 1, or it may have a shape selected from those of the top covers 12a to 12d for modified vertical multitubular heat exchangers 1a to 1d shown in FIGS. 2 to 5. Further, the attachment between the top cover 12 and the upper tube sheet 8 may be of a cover/sheet separated type as shown in FIG. 1, or it may have the form of a cover/sheet integrated type, a tube/sheet integrated type and the like (not shown). Also, the attachment between the bottom cover 14 and the lower tube sheet 10 may be of a tube/sheet fixed type as shown in FIG. 1, or it may have the form of a floating head/gland type, a floating head/split flange type, a floating head/pull-out type and the like (not shown).

Thus, the vertical multitubular heat exchanger 1 is provided with an upper space 16 defined by the top cover 12 and the top tube sheet 8, an intermediate space 18 defined by the tubular shell 2, the upper tube sheet 8, and the lower tube sheet 10, and a lower space 20 defined by the bottom cover 14 and the lower tube sheet 10. Also, the top cover 12 has a top port 22 that communicates with the upper space 16, while the bottom cover 14 has a bottom port 24 that communicates with the lower space 20.

Further, the vertical multitubular heat exchanger 1 has a plurality of heat exchanger tubes 28 each of which is fixed to the upper tube sheet 8 and the lower tube sheet 10 at the outer circumference 26 of both ends thereof, respectively, and communicates the upper space 16 with the lower space 20. As explained below, since the process fluid is introduced into the heat exchanger tubes 28, the tubes 28 are preferably made of a material that does not react with nor degenerate the easily-polymerizable substance and, in addition, a material that does not cause any corrosion on the heat exchanger tubes 28 themselves and is easily welded. Thus, the heat exchanger tubes 28 are made of, for example, austenitic steel pipes, austenitic-ferritic steel pipes, or ferritic steel pipes.

The tubular shell 2 is provided with two ports 30 and 32 communicating with the intermediate space 18, wherein a fluid that exchanges heat with the process fluid introduced into the heat exchanger tubes 28 is retained within and flows through the intermediate space 18 via the ports 30 and 32. The intermediate space 18 may be of a 1-path type having a single chamber as shown in FIG. 1, or it may be of a 2-path or 3-path type (not shown) where the intermediate space 18 is partitioned into a plurality of chambers. The intermediate space 18 may also be provided with a partition to define a channel therein, wherein the channel in the intermediate space 18 may be of a longitudinal baffle 2-path type, a diverging flow type, a double diverging flow type, a splitting flow type, and the like.

The upper surface 34 of the upper tube sheet 8 is sloped downward from the outer part 36 toward the central part 38 thereof. The slope angle θ of the upper surface 34 relative to the plane containing the upper outer edge 40 of the upper surface 34 is preferably 0.005 to 0.1 radian, more preferably 0.006 to 0.04 radian, and still more preferably 0.007 to 0.02 radian. It is preferred that a polishing process be applied to the upper surface 34 of the upper tube sheet 8 by, for example, mechanical polishing such as buffing or electrolytic polishing, but, on the other hand, such a process may not have to be applied. Further, in the vicinity of the lowest position or in the central part 38 of the upper surface 34 of the upper tube sheet 8, a lowest heat exchanger tube 28L is disposed.

Also, the lower surface 42 of the lower tube sheet 10 is sloped downward from the outer part 44 toward the central part 46 thereof. The slope angle of the lower surface 42 relative to the plane containing the lower outer edge of the lower surface 42 is preferably selected from the same range of slope angles as the upper surface 34 of the upper tube sheet 8 explained above.

Figure 6:
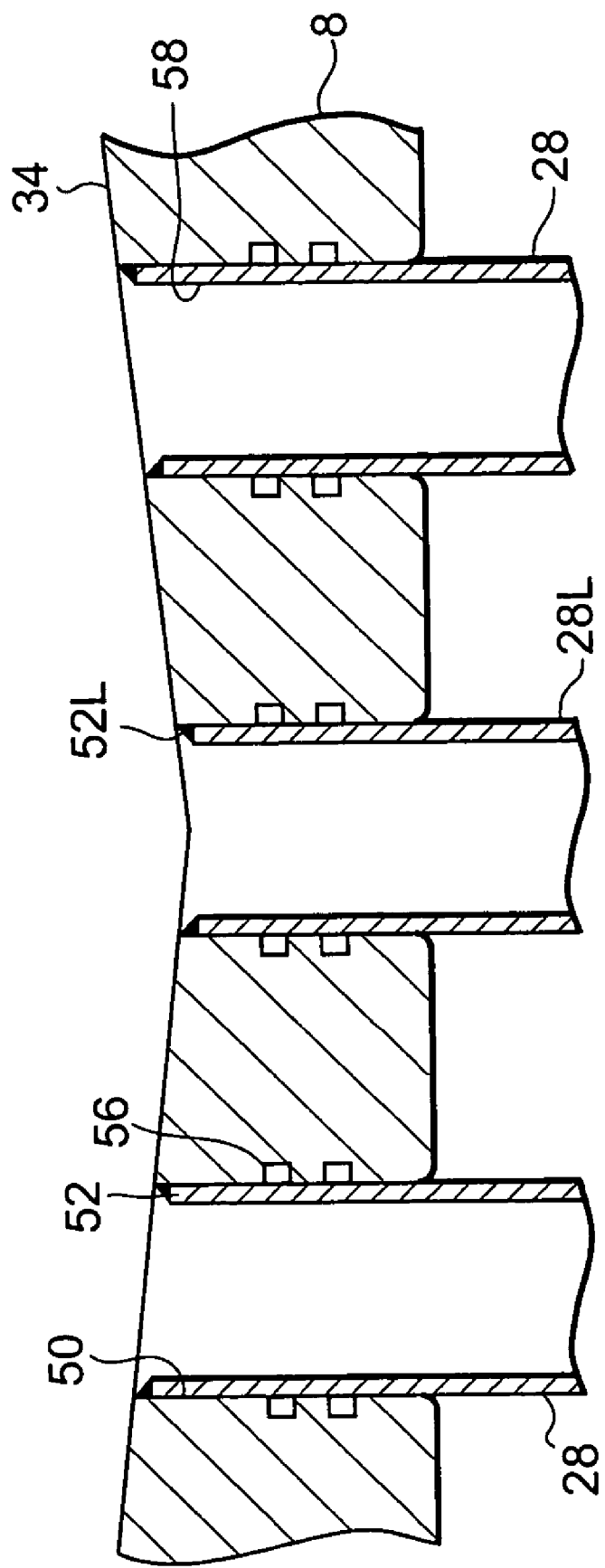
FIG. 6 is a partially enlarged sectional view of the vertical multitubular heat exchanger according to the first embodiment of the present invention.

Portions of the heat exchanger tubes 28 for connecting the tubes 28 to the upper and lower tube sheets 8 and 10 will be explained. Since the portions of the heat exchanger tubes 28 for connecting tubes 28 to the upper tube sheet 8 are structurally similar to the portions of the heat exchanger tubes 28 for connecting the tubes 28 to the lower tube sheet 10, the former case will be only explained with reference to FIG. 6. FIG. 6 is an enlarged sectional view of the connecting portions between the upper tube sheet 8 and the heat exchanger tubes 28.

As shown in FIG. 6, the upper tube sheet 8 has holes 50 into each of which a corresponding heat exchanger tube 28 can fit, and upper ends 52 of all the heat exchanger tubes 28 are positioned lower than the upper surface 34 of the upper tube sheet 8. Each of the holes 50 is provided with several grooves 56 so that, after the heat exchanger tubes 28 are inserted into the holes 50 to be positioned therein, the heat exchanger tubes 28 are expanded and fittingly secured to the upper tube sheet 8. Further, the entire circumferences of the respective upper ends 52 of the heat exchanger tubes 28 are welded to the upper tube sheet 8 so as not to form a step between the upper tube sheet 8 and the upper ends 52 of the heat exchanger tubes 28. Such entire circumference welding between the heat exchanger tubes 28 and the upper tube sheet 8 is also effective for enhancing air tightness therebetween.

Figure 7:
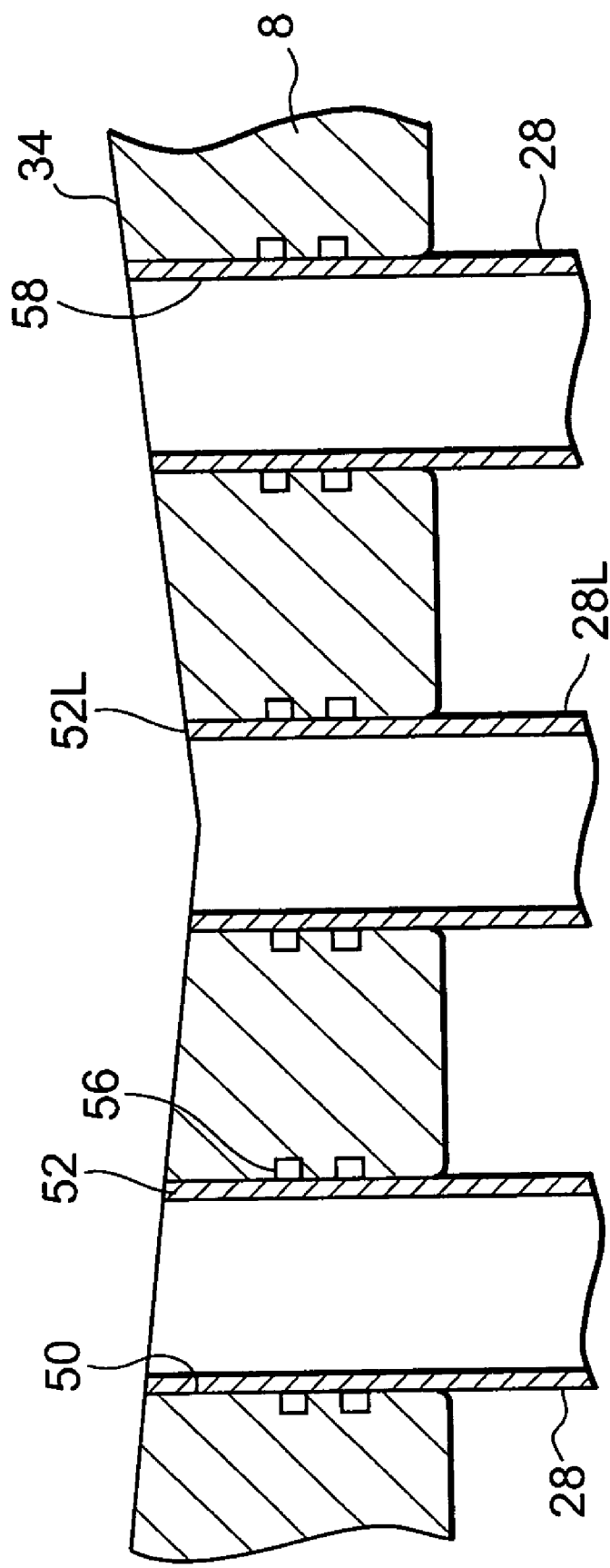
FIG. 7 shows a variation of FIG. 6.

Also as a variation, as shown in FIG. 7, after the heat exchanger tubes 28 are inserted into the holes 50 and then expanded to be fittingly secured to the upper tube sheet 8, the upper end portions of the heat exchanger tubes 28 may be machined or ground so that no step is formed between the upper ends 52 of the heat exchanger tubes 28 and the upper surface 34 of the upper tube sheet 8.

The operation of the above-mentioned vertical multitubular heat exchanger will be explained. For simplicity, a case where methacrolein gas is condensed within the vertical multitubular heat exchanger is explained.

First, the methacrolein gas is introduced into the upper space 16 through the top port 22 of the vertical multitubular heat exchanger 1. A portion of the introduced methacrolein gas is condensed upon contacting the upper surface 34 of the upper tube sheet 8, and the methacrolein liquid produced by the condensation is laid on the upper surface 34 of the upper tube sheet 8.

Since the upper surface 34 of the upper tube sheet 8 is sloped downward from the outer portion 36 toward the central portion 38 and is also smoothed by, for example, buffing, the methacrolein liquid laid on the upper surface 34 of the upper tube sheet 8 flows downward along the upper surface 34 or toward the central portion 38 of the upper tube sheet 8 without being laid on the upper surface 34 of the upper tube sheet 8. The downward-flowing methacrolein liquid flows into the heat exchanger tubes 28 disposed along the way to the central portion or the lowest heat exchanger tube 28L disposed in the vicinity of the central portion. Thus, since the methacrolein liquid is not retained on the upper surface 34 of the upper tube sheet 8 and the like, the adhesion of a methacrolein polymerized material to the upper surface 34 of the upper tube sheet 8 and in the vicinity of the upper ends of the heat exchanger tubes 28 is prevented. In addition, preventing the retention of the methacrolein liquid inhibits the growth of the polymerized material. As a result, flow channels for the methacrolein gas and the methacrolein liquid through the heat exchanger tubes 28 will also be surely obtained.

Also, the methacrolein gas is condensed within the heat exchanger tubes 28. Although the methacrolein liquid produced by the condensation flows along the inner surfaces 58 of the heat exchanger tubes 28, the methacrolein liquid within the heat exchanger tubes 28 is driven by the methacrolein gas and the like flowing downward and thus flows downward without being retained on the inner surfaces 58 of the heat exchanger tubes 28, since the flow channels for the methacrolein gas and the methacrolein liquid flowing through the heat exchanger tubes 28 are surely obtained.

Subsequently, the methacrolein liquid flows out of the heat exchanger tubes 28 at the lower tube sheet 10 side. Most of the methacrolein liquid coming out of the heat exchanger tubes drops down by gravity, whereas a portion of the methacrolein liquid adheres onto the lower surface 42 of the lower tube sheet 10 by surface tension. However, because of the slope formed on the lower surface 42 of the lower tube sheet 10, the methacrolein liquid adhered to the lower surface 42 of the lower tube sheet 10 flows downward or toward the central part thereof without being retained thereon, to fall down therefrom eventually.

Figure 10:
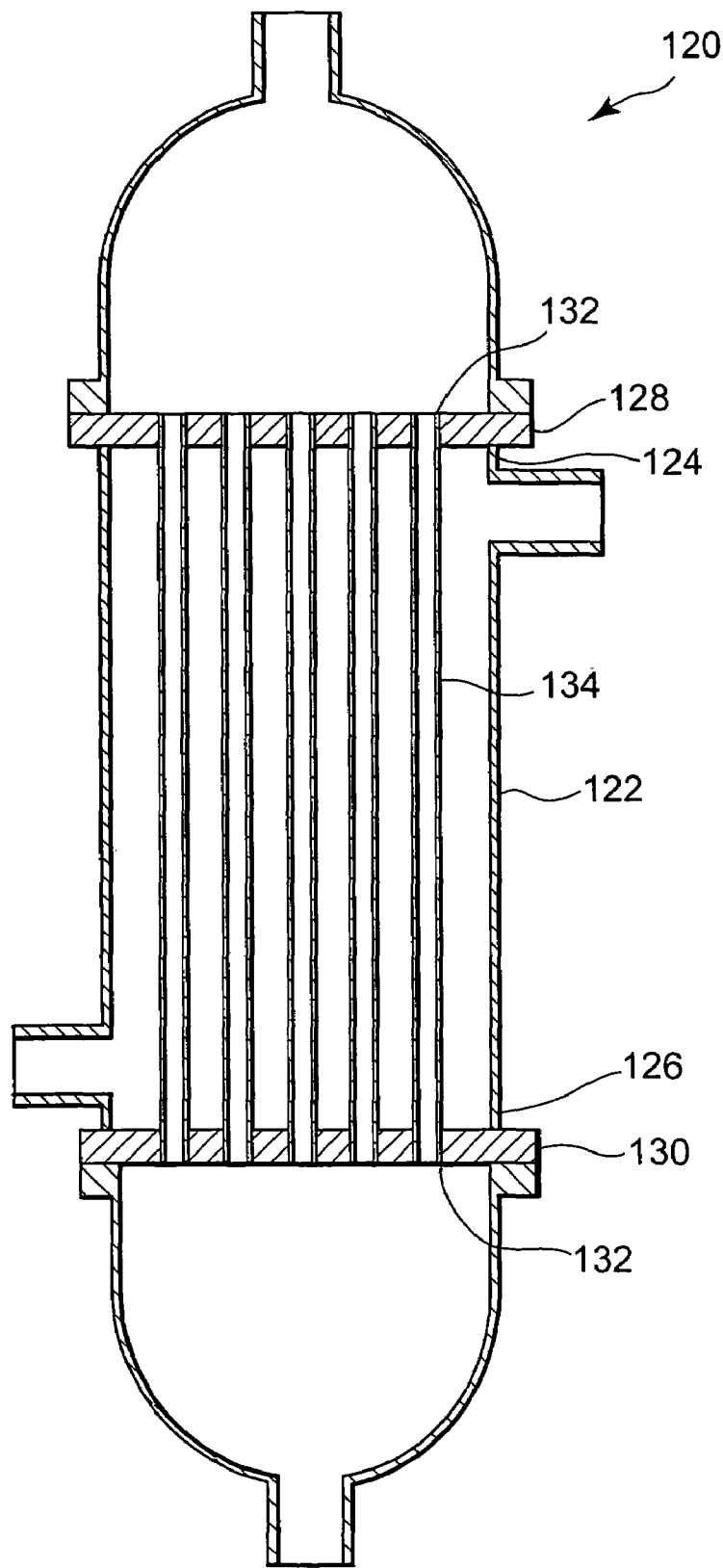
FIG. 10 is a longitudinal sectional view of a conventional vertical multitubular heat exchanger.

In the conventional vertical multitubular heat exchanger 120 (see FIG. 10), since the process fluid tends to be retained for a long period of time on the upper surface 136 of the upper tube sheet 128 and in the vicinity of the upper opening and the like of the inner surface 138 of each heat exchanger tube 134, an easily-polymerizable substance such as methacrolein tends to be polymerized. On the contrary, since the vertical multitubular heat exchanger 1 of the first embodiment is provided such that the methacrolein liquid will not be retained on the upper surface 34 and the like of the upper tube sheet 8, polymerization hardly occurs and the adhesion of the methacrolein polymerized material to the upper surface 34 of the upper tube sheet 8 and in the vicinity of the upper opening and the like of the inner surface 58 of each heat exchanger tube 28 is prevented. In addition, even if the operation of the vertical multitubular heat exchanger 1 is continued, the polymerized material does not grow, thereby preventing any clogging of the heat exchanger tubes 28. Consequently, the operation for removing the polymerized material that has to be frequently conducted for the conventional vertical multitubular heat exchangers becomes unnecessary, which allows for the continuous long term operation of the vertical multitubular heat exchanger.

Also, since the adhesion of the polymeric matter is prevented, decrease in the heat transfer efficiency of the vertical multitubular heat exchanger 1 can be prevented and decrease in heat exchanger effectiveness and separation efficiency of the vertical multitubular heat exchanger 1 can also be prevented.

Figure 8:
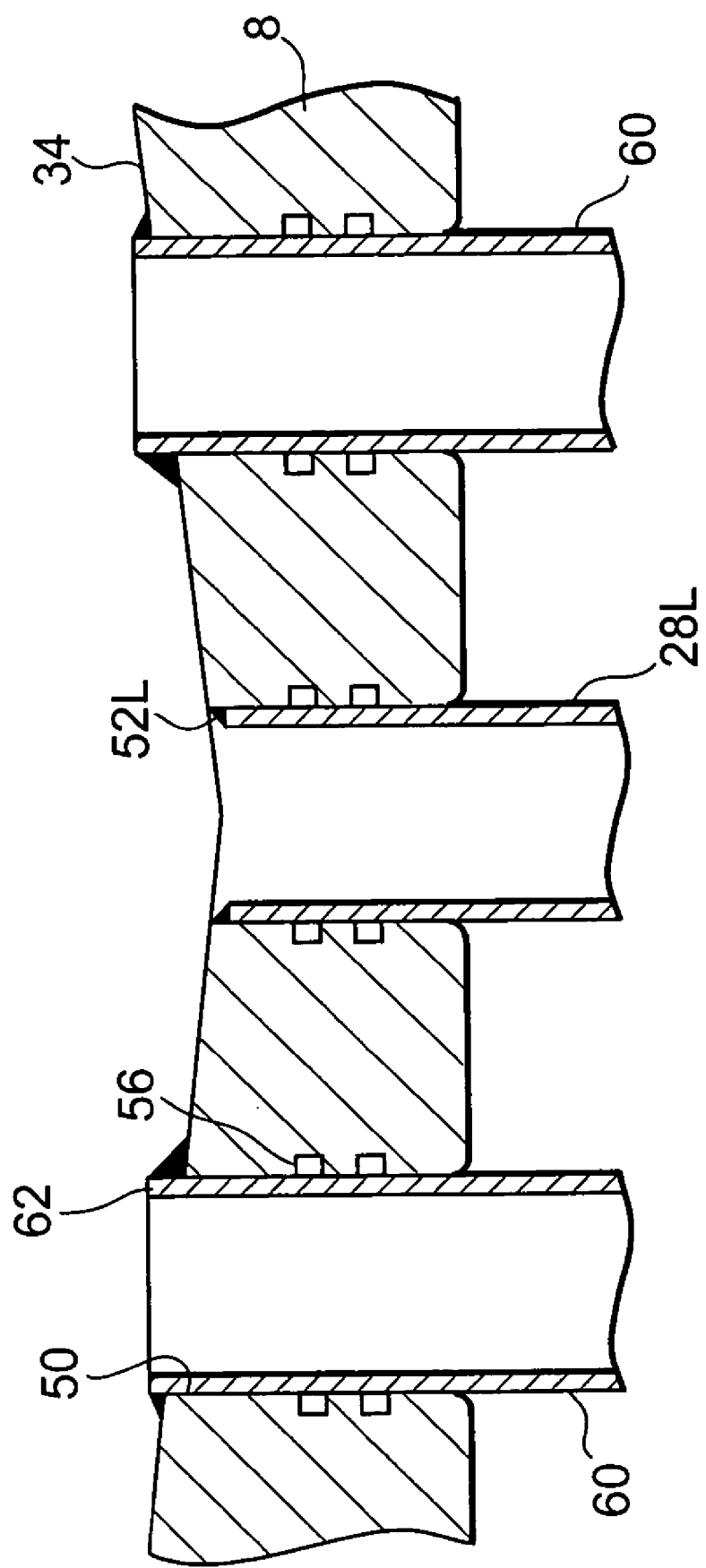
FIG. 8 is a partially enlarged sectional view of the vertical multitubular heat exchanger according to a second embodiment of the present invention.

A vertical multitubular heat exchanger according to a second embodiment of the present invention will be described with reference to FIG. 8. The vertical multitubular heat exchanger according to the second embodiment is similar to that of the first embodiment and is characterized in that the heat exchanger tubes except the one disposed in the central portion protrude from the upper surface of the upper tube sheet. Therefore, the second embodiment will be explained only with regard to the structures or elements which differ from the first embodiment. Also, in the drawings, the elements of the second embodiment similar to those of the first embodiment have the same reference numerals as those of the first embodiment. FIG. 8 is an enlarged sectional view of the connecting portion between the upper tube sheet and the heat exchanger tubes of the vertical multitubular heat exchanger according to the second embodiment.

As shown in FIG. 8, in the vertical multitubular heat exchanger according to the second embodiment, the upper end 52L of the lowest heat exchanger tube 28L does not, similarly to the first embodiment, protrude from the upper surface 34 of the upper tube sheet 8, whereas the upper ends 62 of all the other heat exchanger tubes 60 protrude from the upper surface 34 of the upper tube sheet 8. Entire circumference welding is applied between the heat exchanger tubes 60 and the upper tube sheet 8 so as to achieve smooth connections between the upper ends 62 of the heat exchanger tubes 60 and the upper surface 34 of the upper tube sheet 8. Entire circumference welding between the heat exchanger tubes 60 and the upper tube sheet 8 is also effective for enhancing air tightness therebetween.

In the vertical multitubular heat exchanger according to the second embodiment, the connecting strength between the upper tube sheet 8 and the heat exchanger tubes 60 can be increased. Accordingly, even if the vertical multitubular heat exchanger is constantly subjected to the vibrations caused by the flowing in and out of the process fluid or the fluid which exchanges heat with the process fluid, the vibrations caused by the pump or the compressor, and a pulsating flow directly from rotary pump machinery or the like, the sealing performance of the connecting portions between the heat exchanger tubes 60 and the upper tube sheet 8 is prevented from being lowered, and therefore leaks of the process fluid from the connecting portions therebetween can be prevented. Further, the increased connecting strength provided by the heat exchanger tubes 60 disposed around the lowest part heat exchanger tube 28L also prevents the sealing performance of the connecting portions between the lowest part heat exchanger tube 28L and the upper tube sheet 8 from being lowered. Also, when increasing the heat transfer efficiency by deceasing the diameter of the heat exchanger tubes 60 and also increasing the number of the tubes so as to broaden the heat-exchangeable heat transfer surface, the connection of multiple thin heat exchanger tubes 60 and the upper tube sheet 8 can be surely performed.

Figure 9:
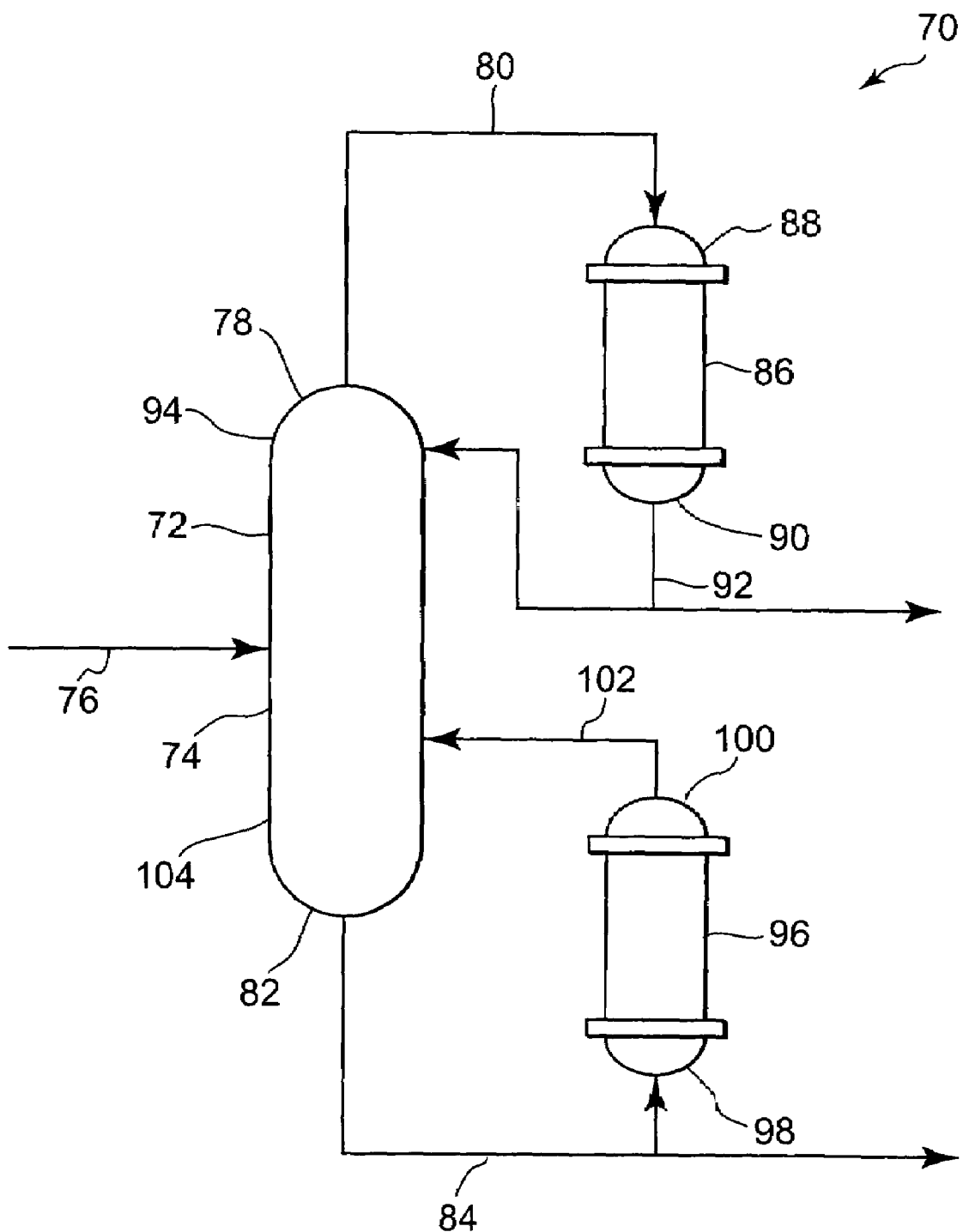
FIG. 9 is a schematic view of a distillation column system comprising the vertical multitubular heat exchanger according to the present invention.

An embodiment of a distillation column system utilizing the vertical multitubular heat exchanger of the present invention will be explained with reference to FIG. 9. FIG. 9 is a schematic view of the distillation column system comprising the vertical multitubular heat exchangers according to the embodiment of the present invention.

As shown in FIG. 9, the distillation column system 70 has a distillation column 72 capable of distilling material containing an easily-polymerizable substance. The distillation column 72 comprises a supply pipe 76 connected to an intermediate portion 74, a top pipe 80 connected to a column top 78, and a bottom pipe 84 connected to a column bottom 82. The top pipe 80 of the distillation column 72 is connected to the top portion 88 of the vertical multitubular heat exchanger 86, which is the above-mentioned embodiment of the present invention and also works as a condenser. A distillate pipe 92 which is branched into two separate pipes is connected to the bottom part 90 of the condenser 86, one pipe being connected to the upper portion 94 of the distillation column 72 and the other being connected to an outside. The bottom pipe 84 of the distillation column 72 is also branched into two separate pipes, one pipe being connected to the bottom part 98 of the vertical multitubular heat exchanger 96, which is the embodiment of the present invention and also works as a reboiler, and the other being connected to the outside. A temperature control pipe 102 which is connected to the lower portion 104 of the distillation column 72 is connected to the top part 100 of the reboiler 96. To prevent polymerization of the easily-polymerizable substance as well as improve the efficiency of the column, the distillation column 72 is preferably a plate column (a tray column), but it may be provided as a packed tower, a wet wall tower, a spray tower, and the like.

An operation of the distillation column system 70 will be explained by describing the case where methacrolein is distilled from a methacrolein-containing liquid.

First, the methacrolein-containing liquid is prepared. Such a methacrolein-containing liquid can be obtained for example by bringing a methacrolein-containing gas, which is obtained by catalytic gaseous phase oxidation of isobutylene with a molecular oxygen-containing gas, into contact with water to collect methacrolein in the form of an aqueous solution of methacrolein. The methacrolein-containing liquid is then supplied into the distillation column 72 through the supply pipe 76.

A polymerization inhibitor is preferably added to the methacrolein-containing liquid in order to inhibit polymerization. The polymerization inhibitor includes one or more kinds thereof selected from a group consisting of a molecular oxygen-containing gas, hydroquinone, methoquinone, cresol, phenol, t-butylcatechol, diphenylamine, phenothiazine, and methylene blue, one or more kinds thereof selected from a group consisting of a copper salt compound such as dimethyldithio copper carbamate, diethyldithio copper carbamate, dibuthyidithio copper carbamate, and copper salicylate, and a manganese salt compound such as manganese acetate, p-phenylenediamines such as p-phenylenediamine, an N-oxyl compound such as 4-hydroxy-2,2,6,6-tetramethylpiperidinooxyl, carbamides such as urea, thiocarbamides such as thiourea, and the like. One of these polymerization inhibitors may be added as a single inhibitor, or two or more inhibitors may be added in combination. Upon adding the polymerization inhibitor(s) to the methacrolein-containing liquid, the inhibitor(s) may be introduced directly into the distillation column 72, or it may be dissolved in a supply liquid, a reflux liquid, or other solvent and then introduced through a liquid feed line (not shown). Also, if the polymerization inhibitor is the molecular oxygen-containing gas, it may be directly mixed into the easily-polymerizable substance by bubbling and the like, or alternatively it may be dissolved in a solvent and then mixed indirectly into the easily-polymerizable substance. Upon performing the bubbling, the molecular oxygen-containing gas is preferably supplied through the column bottom 82 of the distillation column 72 and/or through the reboiler 96.

The methacrolein-containing liquid supplied into the distillation column 72 is then vaporized into the methacrolein gas and fed from the column top 78 of the distillation column 72 to the top port 22 of the condenser 86 via the top pipe 80. It is noted that, although the methacrolein gas contains the polymerization inhibitor, a portion of the polymerization inhibitor is removed from the methacrolein gas within the distillation column 72 and consequently the methacrolein gas may not contain a sufficient amount of the polymerization inhibitor to prevent methacrolein from being polymerized.

The methacrolein gas fed into the condenser 86, which is the vertical multitubular heat exchanger of the present invention, is then condensed into the methacrolein liquid. As explained above, since no methacrolein liquid is retained on the upper surface 34 of the upper tube sheet 8 and in the heat exchanger tubes 28 or the like of the condenser 86, the adhesion of the polymerized material is prevented to allow for a long-term continuous operation of the condenser 86. As a result, the long-term continuous operation of the distillation column system 70 as a whole is also made possible.

On the other hand, the methacrolein-containing liquid taken out from the column bottom 82 of the distillation column 72 is forced to flow upward within the reboiler 96 from the bottom to the top. The temperature of the methacrolein-containing liquid is controlled by a heating operation as it flows through the reboiler 96 and the temperature-controlled methacrolein is returned through the temperature control pipe 102 to the lower part 104 of the distillation column 72. During a steady operation, since the methacrolein-containing liquid flows upward in the reboiler 96 from the bottom to the top without being retained and accordingly the upper surface 34 of the upper tube sheet 8 of the reboiler 96 is filled with the methacrolein-containing liquid, adhesion of the polymerized material hardly occurs.

During the long-term continuous operation of the distillation column system 70, the methacrolein-containing liquid remaining within the distillation column 72 and the reboiler 96 may be collected through the reboiler 96 and the bottom pipe 84 after the operation of the distillation column system 70 is temporarily stopped for a periodic inspection or trouble with other equipment and the like. Upon collecting the methacrolein-containing liquid, it flows downward from the top to the bottom within the reboiler 96, which is also the vertical multitubular heat exchanger of the present invention. The methacrolein-containing liquid, when it flows in this manner, is not retained on the upper surface 34 of the upper tube sheet 8 and the lower surface 42 of the lower tube sheet 10 or the like of the reboiler 96, and therefore adhesion of the polymerized material onto the upper surface 34 of the upper tube sheet 8 and the lower surface 42 of the lower tube sheet 10 or the like is prevented, as in the case with the condenser 86 explained above. Accordingly, after the operation of the reboiler 96 is restarted, the clogging in the heat exchanger tubes 28 due to the growth of the polymeric matter is prevented. Consequently, this allows the reboiler 96 and also the distillation column system 70a to operate continuously for an extended period of time after re-starting the operation, without requiring any inspection in the inside of the reboiler 96 upon its operation being restarted.

While the embodiments of the vertical multitubular heat exchanger according to the present invention have been explained, the following variations may be made.

While, in the above-mentioned embodiments, the upper surface 34 of the upper tube sheet 8 is sloped down from the outer portion 36 toward the central portion 38, the upper surface may be sloped downward toward a position that is deviated from the central portion 38 or there may be two or more positions that are lower than other portions.

There have been explained the first embodiment where the upper ends 52 of all the heat exchanger tubes 28 do not protrude from the upper surface 34 of the upper tube sheet 8, and the second embodiment where only the upper end 52L of the lowest part heat exchanger tube 28L does not protrude from the upper surface 34 of the upper tube sheet 8 while the upper ends 62 of the other heat exchanger tubes 60 protrude from the upper surface 34 of the upper tube sheet 8. Alternatively, however, the upper ends 52 of all the heat exchanger tubes 28 may protrude from the upper surface 34 of the upper tube sheet 8, or the upper ends 52 of several heat exchanger tubes 28 disposed in the vicinity of the lowest part heat exchanger tube 28L may not protrude from the upper surface 34 of the upper tube sheet 8 while the upper ends of the other heat exchanger tubes 28 protrude from the upper surface 34 of the upper tube sheet 8. The greater the number of the heat exchanger tubes 28 the upper ends 52 of which do not protrude from the upper surface 34 of the upper tube sheet 8, the more the adhesion of the polymerized material is prevented, and the greater the number of the heat exchanger tubes 60 the upper ends 62 of which protrude from the upper surface 34 of the upper tube sheet 8, the greater the coupling strength between the upper tube sheet 8 and the heat exchanger tubes 60 is obtained.

Also, while in the above-mentioned embodiments, the distillation of methacrolein has been described, the present invention may be applied to the distillation of methacrylic acid as well. In this case, a methacrylic acid-containing liquid may be prepared, for example, as an aqueous solution of the methacrylic acid as a collection of the methacrylic acid obtained by bringing a methacrylic acid-containing gas obtained by catalytic gaseous phase oxidation of methacrolein with a molecular oxygen-containing gas into contact with water, an extracted liquid obtained by extracting the methacrylic acid from the above-mentioned aqueous solution of the methacrylic acid using an organic solvent as an extraction agent, or a fluid obtained by properly distilling the above-described extracted liquid.

Further, instead of the methacrolein-containing liquid or the methacrylic acid-containing liquid, other easily-polymerizable substances may be distilled. The easily-polymerizable substances include, for example, the ester form of methacrylic acid, acrylic acid and maleic acid or the ester form thereof, styrene, and acrylonitrile. These easily-polymerizable substances may further include a mixture with a high boiling-point substance or a solvent, or with a byproduct from the formation of the easily-polymerizable substance. In the case of acrylic acid and an acrylic ester, the mixture can include a mixture of acetic acid, propionic acid, acrolein, maleic acid, water, and formalin or the like, which are the by-products upon obtaining the acrylic acid by catalytic gaseous phase oxidation reaction. Also in the case of methacrolein, the mixture can include a mixture of acetic acid and water or the like, which are the by-products upon obtaining the methacrolein by a catalytic gaseous phase oxidation reaction. Also in the case of methacrylic acid and ester methacrylate, the mixture can include a mixture of acrylic acid and acetic acid or the like, which are the by-products upon obtaining the methacrylic acid by a catalytic gaseous phase oxidation reaction.

Further, while in the above-mentioned embodiments the lower surface 42 of the lower tube sheet 10 is sloped downward from the outer portion 44 toward the central portion 46, it may be sloped upward from the outer portion 44 toward the central portion 46.

Furthermore, a case where the vertical multitubular heat exchanger of the present invention is used as a condenser for a distillation column system and a case where it is used as a reboiler for the distillation column system have been described above. However, the vertical multitubular heat exchanger of the present invention is not limited to being used as the condenser 86 and the reboiler 96. Instead, it may include other types of condensers, coolers, heaters, or evaporators as well.

In addition, the vertical multitubular heat exchanger of the present invention may be provided with a baffle plate, a longitudinal baffle plate, an impingement baffle, a channel flange, a shell cover flange, a shell side nozzle, a floating head cover, a fixing rod and a spacer, a degassing connection, a drainage connection, a instrument connection, a support saddle, a lifting lug, a level gauge connection, a component for preventing thermal expansion of an expansion joint and the like, all of which are included in a typical heat exchanger.

EXAMPLES

Examples 1 to 4 of the present invention will be compared with comparative examples 1 to 4. The examples of the present invention are the condenser and the reboiler wherein the upper tube sheet of each of them has a sloped upper surface, and the comparative examples are a conventional condenser and a conventional reboiler wherein each of them has a flat upper tube sheet and a flat lower tube sheet. A common distillation column is used in the examples 1 to 4 and the comparative examples 1 to 4, which column has an inner diameter of 0.15 m and is equipped internally with a 30-stage stainless steel (SUS304) sieve tray. The surfaces of the upper and lower tube sheets for the condenser and the reboiler of the examples 1 to 4 are sloped downward from the peripheries toward the central portions thereof, and the slope angle is 0.01 radian relative to planes containing the peripheries of the respective tube sheets.

Examples 1 and 2 and Comparative Examples 1 and 2

Purification of Methacrolein-Containing Liquid

The methacrolein-containing liquid was supplied into the distillation column. The composition of the supplied methacrolein-containing liquid was 93% by weight of methacrolein, 3% by weight of acetic acid, and 4% by weight of water, and the supplied amount of the methacrolein-containing liquid was 50 kg/hr. 200 ppm of hydroquinone as a polymerization inhibitor was added to the methacrolein-containing liquid, which was then rectified with air being introduced as a molecular oxygen-containing gas by 0.3% by volume relative to the vapor volume generated by the reboiler. The distilation column was operated and managed at the column top pressure of 101 kPa, the column top temperature of 66 degrees Celsius, the column bottom pressure of 104 kPa, the column bottom temperature of 76 degrees Celsius, and the reflux ratio of 3.

In both the example 1 and the comparative example 1, none of the heat exchanger tubes protruded from the upper surface of the upper tube sheet. In both of the embodiment 2 and the comparative example 2, only one heat exchanger tube disposed in the central portion (corresponding to the lowest position in the example 2) did not protrude from the upper surface of the upper tube sheet while the other heat exchanger tubes protruded from the upper surface of the upper tube sheet. For the lower tube sheet in each of the examples 1 and 2 and the comparative examples 1 and 2, a type of the lower tube sheet where all the heat exchanger tubes protruded from the lower surface was used.

In the examples 1 and 2, the operation was stopped for a while after the distillation column had been operated continuously for two weeks, and the process fluid containing the methacrolein-containing liquid was drawn out. Two days later, the operation of the distillation column was restarted and then the operation was continuously conducted for another six months. Thereafter, the heat exchanger tubes and the upper and lower tube sheets of the condenser and the reboiler were inspected. As a result, no adhesion of the methacrolein polymeric matter was observed.

On the contrary, in the comparative example 1 where an attempt was made to operate the distillation column in a way similar to that in the example 1, clogging occurred in the condenser two months after its operation was restarted, and the operation was stopped because the condenser had become unusable. When the upper surface of the upper tube sheet and the heat exchanger tubes in the condenser were inspected, it was observed that the upper surface of the upper tube sheet was completely covered with the polymerized material and almost all the heat exchanger tubes were clogged with polymerized material. In the reboiler also, approximately 5 kg of the polymerized material was adhered on the upper surface of the upper tube sheet, and approximately 50% of the heat exchanger tubes thereof were clogged with the polymerized material. In addition, it was observed that a small amount of the polymerized material was also adhered on the lower surfaces of the lower tube sheets of the condenser and the reboiler.

Also in the comparative example 2 where an attempt was made to operate the distillation column in a way similar to that in the example 2, the condenser was clogged about two months after its operation was restarted which is a period of time similar to that in the comparative example 1, and the operation was stopped became the condenser had become unusable. The adhesion condition of the polymerized material on the tube sheets in the condenser and the reboiler and the clogging condition of the heat exchanger tubes were similar to those in the comparative example 1, except that the polymerized material adhered on the upper surface of the upper tube sheet of the reboiler was approximately 4 kg.

Examples 3 and 4 and Comparative Examples 3 and 4

Purification of Methacrylic Acid-Containing Liquid

The methacrylic acid-containing liquid was supplied into the distillation column. The composition of the supplied methacrylic acid-containing liquid was 95% by weight of methacrylic acid, 2% by weight of acetic acid, and 3% by weight of acrylic acid, and the supplied amount of the methacrylic acid-containing liquid was 80 kg/hr. 200 ppm of hydroquinone as a polymerization inhibitor was added to the methacrylic acid-containing liquid, which was then rectified with air being introduced as a molecular oxygen-containing gas by 0.3% by volume relative to the vapor volume generated by the reboiler. The distillation column was operated and managed at the column top pressure of 8 kPa, the column top temperature of 77 degrees Celsius, the column bottom pressure of 10 kPa, the column bottom temperature of 99 degrees Celsius, and the reflux ratio of 2.

In both the example 3 and the comparative example 3, none of the heat exchanger tubes protruded from the upper surface of the upper tube sheet. In both the example 4 and the comparative example 4, only one heat exchanger tube disposed in the central portion (corresponding to the lowest position in the example 4) did not protrude from the upper surface of the upper tube sheet while the other heat exchanger tubes protruded from the upper surface of the upper tube sheet. For the lower tube sheet in each of the examples 3 and 4 and the comparative examples 3 and 4, a type of the lower tube sheet where all the heat exchanger tubes protruded from the lower surface was used.

In the examples 3 and 4, the operation was stopped for a while after the distillation column had been operated continuously for two weeks, and the process fluid containing the methacrylic acid-containing liquid was drawn out. Two days later, the operation of the distillation column was restarted and then the operation was continuously conducted for another six months. Thereafter, the heat exchanger tubes and the upper and lower tube sheets of the condenser and the reboiler were inspected. As a result, no adhesion of the methacrylic acid polymeric matter was observed.

On the contrary, in the comparative example 3 where an attempt was made to operate the distillation column in a way similar to that in the example 3, clogging occurred in the condenser three months after its operation was restarted, and the operation was stopped because the condenser had become unusable. When the upper surface of the upper tube sheet and the heat exchanger tubes in the condenser were inspected, it was observed that the upper surface of the upper tube sheet was completely covered with the polymerized material and almost all the heat exchanger tubes were clogged with polymerized adhesive material. In the reboiler also, approximately 5 kg of the polymerized material was adhered on the upper surface of the upper tube sheet thereof, and approximately 60% of the heat exchanger tubes thereof were clogged with the polymerized material. In addition, it was observed that a small amount of the polymerized material was also adhered on the lower surfaces of the lower tube sheets of the condenser and the reboiler.

Further, in the comparative example 4 where an attempt was made to operate the distillation column in a way similar to that in the example 4, clogging occurred in the condenser four months after its operation was restarted, and the operation was stopped because the condenser had become unusable. When the upper surface of the upper tube sheet and the heat exchanger tubes in the condenser were inspected, it was observed that the upper surface of the upper tube sheet was completely covered with the polymerized material and almost all the heat exchanger tubes were clogged with polymerized adhesive material. In the reboiler aslo, approximately 6 kg of the polymerized material was adhered on the upper surface of the upper tube sheet thereof, and approximately 70% of the heat exchanger tubes thereof were clogged with the polymerized material. In addition, it was observed that a small amount of the polymeric matter was also adhered on the lower surfaces of the lower tube sheets of the condenser and the reboiler.

As explained above, the vertical multitubular heat exchanger according to the present invention can prevent clogging by the polymerized material and therefore can be operated continuously for an extended period of time. Further, the distillation column system according to the present invention can be operated continuously for an extended period of time.

Although the present invention has been explained with reference to specific, preferred embodiments, one of ordinary skill in the art will recognize that modifications and improvements can be made while remaining within the scope and sprit of the present invention. The scope of the present invention is determined solely by appended claims.

What is claimed is:

1. A vertical multitubular heat exchanger for performing heat exchange by introducing into heat exchanger tubes a process fluid containing an easily polymerizable substance, the heat exchanger comprising:
    a body extending in a vertical direction,
    an upper tube sheet and a lower tube sheet respectively disposed at the upper portion and the lower portion of the body; and
    a plurality of vertically extending heat exchanger tubes whose outer circumferences of both ends are respectively fixed to the upper tube sheet and the lower tube sheet;
    wherein an upper surface of the upper tube sheet is formed to be sloped downward from an outer part toward a central part thereof by 0.005 to 0.1 radian relative to a plane containing the upper outer edge of said upper tube plate, and at least one of the heat exchanger tubes is disposed in the vicinity of the lowest position of the upper surface of the upper tube sheet.

2. The vertical multitubular heat exchanger according to claim 1, wherein the upper end of said heat exchanger tube disposed in the vicinity of the lowest position of the upper tube sheet is provided so as to not protrude from the upper surface of the upper tube sheet.

3. A vertical multitubular heat exchanger according to claim 1, wherein a lower surface of the lower tube sheet is formed to be sloped downward from an outer part toward a central part thereof by 0.005 to 0.1 radian relative to a plane containing the lower outer edge of the lower tube sheet.

4. A vertical multitubular heat exchanger according to claim 1, wherein the easily-polymerizable substance is acrolein, methacrolein, acrylic acid, methacrylic acid or ester thereof.

5. A vertical multitubular heat exchanger according to claim 1, wherein said process fluid further contains a polymerization inhibitor.

6. A distillation column system comprising a distillation column for distilling a fluid containing an easily-polymerizable substance and a condenser connected to a column top of the distillation column, the condenser being a vertical multitubular heat exchanger according to claim 1.

7. A distillation column system comprising a distillation column for distilling a fluid containing an easily-polymerizable substance and a reboiler connected to a column bottom of the distillation column, the reboiler being a vertical multitubular heat exchanger according to claim 1.

8. A distillation column system comprising a distillation column for distilling a fluid containing an easily-polymerizable substance, a condenser connected to a column top of the distillation column, and a reboiler connected to a column bottom of the distillation column, the condenser and the reboiler being vertical multitubular heat exchangers according to claim 1.

* * * * *